United States Patent [19]

Easter, II

[11] Patent Number: 4,586,659
[45] Date of Patent: May 6, 1986

[54] SYSTEMITIZED WASTE PRODUCT SEPARATION AND TOTAL UTILIZATION

[76] Inventor: James M. Easter, II, P.O. Box 23, Owings Mills, Md. 21117

[21] Appl. No.: 678,099

[22] Filed: Dec. 4, 1984

Related U.S. Application Data

[63] Continuation-in-part of Ser. No. 517,958, Oct. 6, 1983, abandoned, which is a continuation of Ser. No. 251,490, Apr. 6, 1981, abandoned.

[51] Int. Cl.$^4$ .............................................. B02C 21/00
[52] U.S. Cl. ........................................ 241/24; 241/25; 241/79.1; 241/183; 241/DIG. 38; 71/13
[58] Field of Search .................. 71/9, 12, 13; 241/24, 241/101 B, 79.1, 183, DIG. 38, 25, 79

[56] References Cited

U.S. PATENT DOCUMENTS

| | | | |
|---|---|---|---|
| 3,533,775 | 10/1970 | Brown | 71/13 X |
| 3,579,320 | 5/1971 | Pesses | 241/DIG. 38 |
| 3,680,799 | 8/1972 | Hallerback | 241/183 |
| 4,010,098 | 3/1977 | Fassell | 71/12 X |

Primary Examiner—Howard N. Goldberg
Assistant Examiner—Timothy V. Eley
Attorney, Agent, or Firm—Walter G. Finch

[57] ABSTRACT

The invention is an improved system for separating waste products into several components and then providing for total utilization thereof. The systemitized arrangement integrates numerous automatic operations to produce the separation of the components and then provides for automatically directing the separated components to ultimate destinations for total utilization. The system first processes bulk waste products such as garbage, rubbish, and other discarded material and shreds it into small size particles. The shredded waste products are then mixed with sewage sludge received from another source. The mixture is then processed through a controlled sludge composting means. At this point a first benefit is derived by means of hot exhaust air from the controlled sludge composting means being directed to a hot house structure to aid in the growth of food products. Following the controlled sludge composting means the resulting compost is separated by screening and the fine material is further cured for direct use in agriculture and gardening type operations. The large particles are further separated by magnetic and ballistic means into various components for specified distribution and uses. Concurrently, following the aforementioned shredder, a high velocity air classifier directs the paper, light plastics, and similar waste matter to an incinerating process for generating steam which is used for heating, generating electricity, and other useful purposes. The automatic operations eliminates the need for manual labor for separation and classification operations.

24 Claims, 4 Drawing Figures

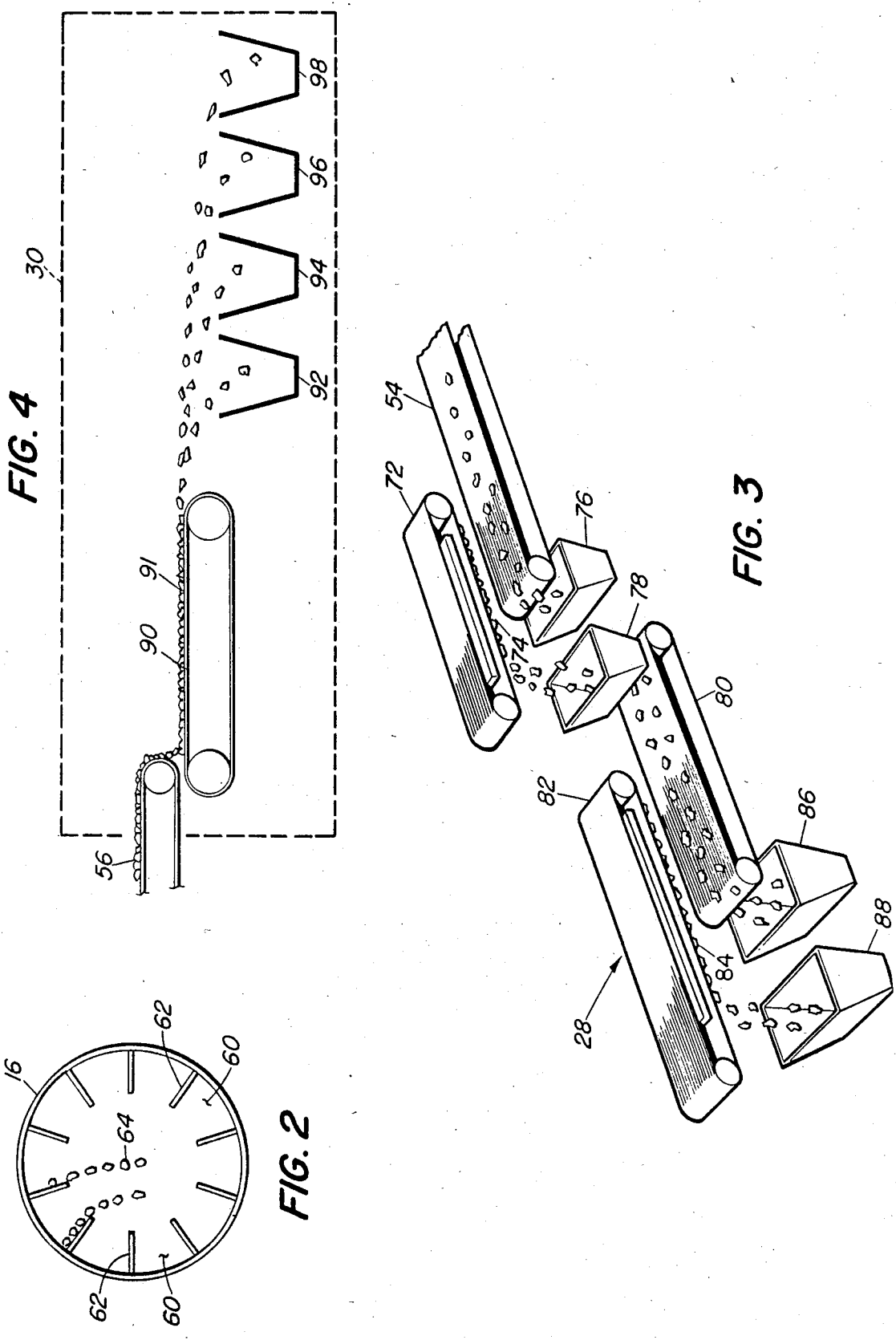

SYSTEMITIZED WASTE PRODUCT SEPARATION AND TOTAL UTILIZATION

BACKGROUND AND SUMMARY OF THE INVENTION

This is a continuation-in-part of U.S. patent application Ser. No. 517,958, now abandoned, filed Oct. 6, 1983, which was a continuaton of U.S. patent application Ser. No. 251,490, now abandoned filed April 6, 1981 by the applicant.

The invention relates to waste product disposal and in particular to the disposal of sewage sludge in combination with other waste products such as garbage, trash, and other rubbish. Specifically, the invention relates to a systemitized method and equipment for automatically and mechanically separating the waste products into several major components and then directing these components for total utilization without manual labor during the processing.

This invention utilizes, as part of the systemitized arrangement, a prior invention of the present applicant, U.S. Pat. No. 4,374,804, issued Feb. 22, 1983 for a Controlled Sludge Composting System.

A need has existed for a long time for an economically feasible method for automatically and mechanically separating waste products into usable, desirable, and acceptable components. This invention provides that economically feasible method in an environmentally sound systemitized procedure and means.

The systemitized waste product separation and total utilization method and means of this invention can be assembled as an arrangement of a single unit of each mechanical component of the invention, or with a redundancy arrangement for each and every mechanical component. Obviously it could be arranged so that redundancy is only present for certain selected mechanical components. Because experience factors may indicate some obstruction can or should be anticipated for certain of the components, redundancy of alternate parallel components should be incorporated. However, for simplicity in the present disclosure only a single unit is portrayed for each mechanical component.

It is to be understood that redundancy for one unit, for a plurality of units, or for the total of all units is within the scope and intent of this invention, even though redundancy is not illustrated in the drawings. The redundancy of any one or all of the components or any combination thereof would be utilized by shunting or switching the path of travel of the waste products being processed.

It is also to be understood that redundancy of any one component, of the systemitized waste product separation and total utilization means, may also be practiced where the output of one mechanical component may exceed the capacity of the next succeeding mechanical component or group of mechanical components. Thus, such a redundancy would be for the purpose of avoiding a bottleneck in the operation and such redundancy is within the scope and intent of this invention.

One of the problems encountered in the processing of scrap materials is that the processors of scrap, which is reclaimed from waste products, all want reasonably "clean" scrap. They do not want pieces of glass with paper and garbage clinging to the bits, or pieces of aluminum or ferrous metals similarly contaminated. This invention provides the salvaged scrap bits in a relatively "clean" state, at most needing only a rinse or dip to dislodge bits of composted material that may be on the surface.

In the present invention bacteria does the cleaning. In the prior art the suppliers of scrap materials or the subsequent processors require huge systems and space devoted to the cleaning process in an expensive procedure.

Another aspect of the present invention is that the waste products are cut (shredded) into large size pieces, approximately two inches by two inches, which are easily separated from composted material. In a portion of some of the prior art, such as adapted from foreign systems, all materials are pulverized, so that the entire residue is very fine, like coffee grounds as an example.

In the process of seeking out the ultimate separation of glass, metals, and the like, two other advantages are realized: one is that light weight materials, such as paper, light plastics, and similar bits, are automatically and mechanically removed beforehand and incinerated to produce steam for the generation of electricity and other needed uses; another benefit is that during a step regarding composting, hot exhaust air is utilized in hot houses to assist in the growth of agriculture products.

With the increase in energy needs, wood residue, such as bark, sawdust, wood chips, and the like are used directly for generating heat or steam. Such use makes wood chips scarce and the use of wood chips expensive for a composting operation. In the present operation with the use of general waste products in the composting step, the scarcity of wood chips is not a major problem.

In the prior art, the incinerating of any waste product was preceded by reducing the waste material to very fine particles by ball mills, hammer mills, and other similar processes. Also, in the prior art considerable manual labor was utilized in selectively removing and classifying salvageable materials.

In the present invention, all of the waste products are mixed together, the waste products of metal, glass, garbage, and other trash, rubbish, and other discarded items, and even sewage sludge. Bacteria goes to work on the biodegradable items and decompose it to a compost consistency. The biodegradable materials assisting in the composting process which results is a finely ground compost material, like a coffee grounds consistency. At the same time the various salvageable materials are automatically mechanically separated and classified.

After the composting step, the product is screened to get the fine compost particles for direct agriculture use at this point, or for further processing to remove odors and prepare it for bagging or bulk shipment. The screening removes the large particles which were not decomposed, particularly those which are not biodegradable in the process. These are then mechanically processed in subsequent automatic steps.

There is no reason to follow the prior art process of grinding the waste products to a very fine particle. Instead, the present invention shreds or cuts the waste products into large chunks, approximately two inches by two inches in size. The mechanical processing equipment has a capability of doing this no matter what the material, wood, aluminum, ferrous materials, concrete pieces, paper, and all manner of trash and rubbish. Should any item be in the stream be recognized as a possible bottleneck piece, it could be removed, however, the anticipation is that the shredder component is sufficiently capable of handling essentially any item funneled to it without manual labor.

Subsequent to the screening, the large particles of glass, aluminum, ferrous metals, and other items are fairly clean and acceptable by scrap processors, due to the bacteria action in the composting and then due to the shaking in the screening process. Thereafter the large materials are further separated by magnetic and ballistic type separators.

The heavy ferrous metals are sent to steel mills and tinned items to detinners. The lighter materials separated by the ballistics separator are disposed of according to classification. The non-ferrous materials, such as aluminum, to non-ferrous processors, plastics to plastics processors (those that may be reusable), glass to glass processors, ceramics and other items which may not have a recycling use may be disposed of in land fills or further ground for adding to the compost for agriculture uses. In the non-ferrous group some further separation may be made by a hysteresis method or sold as mixed non-ferrous materials.

During the processing steps, at the point where the waste products are shredded or cut into large chunks or pieces, the shredded materials enter an air classifier. As vanes on the periphery of the drum drop or spill the pieces across the center section of the drum, a high velocity blast of air through the drum drives off the light, high B.T.U. value materials, such as paper, plastics and the like. Such light weight materials average about 60% by weight of a normal stream of trash, rubbish, or similar such waste products.

The light weight, high B.T.U. value materials are then conveyed to an incinerator, while the residue, the heavy materials, are conveyed to the aforementioned composting operation. The light weight materials in the incinerator are used to generate steam for the generation of electricity or for other uses.

It is, therefore, an object of the invention to provide a systemitized waste product separation and total utilization means that automatically and mechanically separates the waste products into usable components.

It is also an object of the invention to provide a systemitized waste product separation and total utilization means that economically utilizes the total group of components of the waste products.

It is another object of the invention to provide a systemitized waste product separation and total utilization means that initially automatically and mechanically reduces the waste products to chunk-size instead of pulverizing them.

It is also another object of the invention to provide a systemitized waste product separation and total utilization means that automatically and mechanically separates the light weight, high B.T.U. content, materials for incineration to generate energy for numerous uses.

It is still another object of the invention to provide a systemitized waste product separation and total utilization means that automatically and mechanically mixes chunk-size waste products with sewage sludge for composting to utilize contaminents on and with the salvageable chunk-size waste products to aid in the composting process.

It is yet another object of the invention to provide a systemitized waste product separation and total utilization means that literally cleans the chunk-size salvageable materials by the automatic and mechanical composting process.

It is yet still another object of the invention to provide a systemitized waste product separation and total utilization means that automatically and mechanically separates the salvageable materials by magnetic and ballistic means.

Further objects and advantages of the invention will become more apparent in the light of the following description of the preferred embodiments.

BRIEF DESCRIPTION OF THE DRAWINGS

FIG. 2 is a partial pictorial representation of an end view of an air classifier as a mechanical component of FIG. 1;

FIG. 3 is a partial pictorial representation of a magnetic separation means as a mechanical component of FIG. 1; and FIG. 4 is a partial pictorial representation of a side view of a ballistic separation means as a mechanical component of FIG. 1.

DESCRIPTION OF THE PREFERRED EMBODIMENTS

Figure 1:
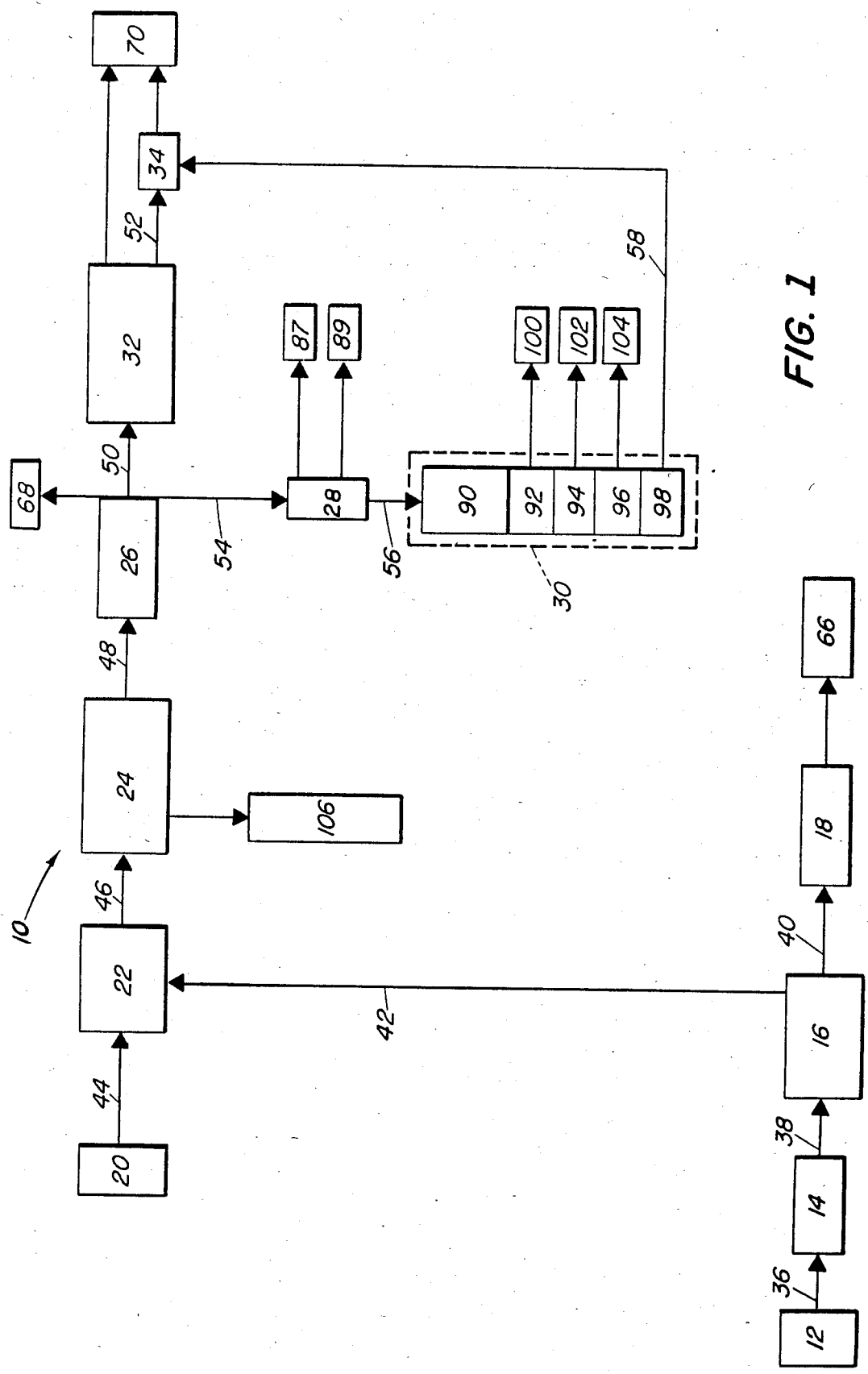
FIG. 1 is a diagramatic flow chart of a systemitized waste product separation and total utilization means.

Referring to the drawings and particularly to FIG. 1, a systemitized waste product separation and total utilization means is shown at 10.

The systemitized waste product separation and total utilization means 10 consists of a receiving area 12 for general waste products, a mechanical shredder means 14, a mechanical air classifier means 16, a mechanical incinerator type energy generation means 18, a sewage sludge receiving means 20, a mechanical waste product and sewage sludge mixing means 22, an automatic and mechanically controlled composting means 24, a mechanical screening means 26, a mechanical magnetic separator means 28, a mechanical ballistic separator means 30, an automatic and mechanical compost curing means 32, a mechanical grinder and mixer means 34, a automatic and mechanical conveyor means 36 through 58 between the aforementioned mechanical components of the systemitized waste product separation and total utilization means 10, as hereinafter described.

Waste products in the form of trash, rubbish, garbage, and other similar materials are delivered by truck or other transport means to a receiving area 12 where an operator controls the feeding of the waste product materials to a shredder means 14 by way of a conveyor means 36. Thereafter, the systemitized waste product separation and total utilization means 10 operates automatically and mechanically.

It is to be understood that it is within the scope and intent of the invention that the receiving area 12 may be an open floor area, a hopper-type means, or any similar arrangement for receiving truck load, or other unit size, of waste product materials.

It is further to be noted and understood that single units of each component (such as the receiving area) are illustrated in the drawings, however, as described hereinbefore, redundancy may be incorporated for each and every or all of the components. Such redundancy is within the scope and intent of this invention.

Operators may place the waste product material on the mechanical conveyor means 36, which leads to the shredder 14, manually or the operation preferably may be automatic. For example, if the receiving area 12 is a hopper-type structure, the mechanical conveyor means 36 may operate at the bottom of such a hopper-type structure and automatically transport the waste product materials to the shredder means 14. Thereafter the entire operation is automatic and mechanical as far as operations are concerned, subject only to controls for indexing or starting and stopping.

The mechanical shredder means 14 chops or shreds the waste products into more or less random size chunk-size pieces, each about two inches square. Another mechanical conveyor means 38 transports the chopped chunk-size waste products to the mechanical air classifier 16.

Attention is directed to the hereinbefore reference to built-in redundancy to assure continuous operation of the systemitized waste product separation and total utilization means 10 at each component. The drawings and the description are and will describe a single path through the various individual components of the systemitized waste product separation and total utilization means 10. However, it is to be understood that any one of the components, any combination of two or more components, or all of the components, may have a redundancy by the installation of parallel components at each step or stage by switching or directing the connecting mechanical conveyor means to the component to take advantage of the redundancy. Such redundancy is within the scope and intent of this invention.

It is also to be understood that this systemitized waste product separation and total utilization means is composed of mechanical components known in the art, such mechanical components modified to fit into the arrangement, and/or mechanical components invented by the applicant and for which a separate patent has been issued as hereinbefore noted. However, it is to be noted that the orderly sequence of the cooperation of these components is an important factor in the systemitized waste product and total utilization overall structure to accomplish the overall objectives of this invention.

As the chopped waste products enter the air classifier 16, the chunk-size pieces drop into a plurality of pockets 60, formed by a plurality of vanes 62 around the interior periphery of the mechanical drum air classifier 16 as shown in FIG. 2. The vanes 62 are spirally configured 63 to move the chunk-size pieces longitudinally through the mechanical air classifier 16. As the mechanical air classifier 16 turns, clockwise or counter-clockwise, the chunk-size pieces follow the spirally configured 63 vanes 62 and begin moving through the mechanical air classifier 16. The spirally configurations 63 of vanes 62 are shown in partial view, for purposes of clarity; in FIG. 2.

As the vanes 62 reach the upper position as the mechanical classifier 16 turns, the chunk-size waste products begin to spill or dump out of the pockets 60 and fall or flutter downwardly 64 by gravity. At the same time a high velocity blast of air from a wind producing source of the mechanical air classifier 16 is blown longitudinally through the mechanical air classifier 16. The light weight and high B.T.U. content particles of waste product, such as paper, cardboard, plastics, and similar materials are blown and driven off and carried by the blast of air through mechanical conveyor means 40 to the mechanical incinerator-type energy generating means 18. The light weight high B.T.U. content materials usually average about 60% by weight of the incoming stream of waste products.

The light weight and high B.T.U. content particles of waste product are burned in the mechanical incinerator type energy generating means 18 to convert the light weight high B.T.U. content particles of waste product to a usable form of energy.

The heat from the burning particles of light weight and high B.T.U. content waste products may be used in numerous ways, depending upon the application 66. The heat may be conveyed for a drying system, it may be used to produce steam for heating water for a usable application or for operating machinery. The reference steam may be used to operate a generator to produce electricity, to operate an air conditioning system, or any number of other uses.

As the light weight and high B.T.U. content waste product particles are removed from the total mass of waste product materials, as described hereinbefore, the residue of heavy particles of the waste particles drop downwardly by gravity in the mechanical air classifier 16. A mechanical conveyor means 42 conveys the heavy particles of waste product from the mechanical air classifier 16 to a mechanical mixer means 22.

From a separate source, sewage sludge is received at a sewage sludge receiving means 20. The sewage sludge is conveyed by a mechanical conveyor means 44 to the mechanical mixer means 22 in an arrangement and manner similar to the arrangement and process as aforementioned for the waste products at the waste products receiving area 12 being moved by mechanical conveyor means 36 to the mechanical shredder 14.

The sewage sludge and the heavy chuck-size particles of waste products are mixed in the mechanical mixing means 22 and then conveyed by mechanical conveyor means 46 to a controlled composting means 24. The mechanical and automatic controlled composting means 24 is a separate invention by the applicant, U.S. Pat. No. 4,374,804, issued Feb. 22, 1983, as hereinbefore noted.

The materials remain in the composting process for a period of time, usually a fourteen day period as the materials proceed in the process automatically through the mechanically controlled composting means 24. The thorough composting of sewage sludge requires three things for a balanced nutritional diet for the aerobic bacteria digesting the material. These are: a carbon to nitrogen ratio in the range of 30 to 1; a moisture content of the mix around 60%; and a bulking agent to admit plenty of oxygen into the pile.

In the prior art this carbon addendum, the absorbent of excess moisture from the sludge, and the bulking material are all supplied in the compositing procedure by essentially one material, wood chips. However, wood chips are expensive, and in the energy crunch are becoming more and more expensive. The present invention overcomes this problem by using chunk-size particles of general waste materials, but at the same time providing an automatic systemitized waste product separation means to achieve total utilization.

Also in the prior art attempts have been made to utilize some solid waste materials by finely grinding them by a grinding or hammermill process. However, this prior art process produces difficulties. The light weight and high B.T.U. content materials are either manually separated or are lost if included in the fine grinding process. Also, the finely ground inorganic waste particles are not digested by the bacteria in any composting process and it is essentially impossible to separate them from the small digested organic particles, or compost, as both are approximately the size of or similar to coffee grounds. The present invention overcomes these difficulties.

Potential purchasers of retrieved and salvaged metals and glass from solid waste are not enthusiastic about glass, aluminum, and tinned cans which are still covered with the remains of their original contents or smeared with food particles from other household garbage. The primary cleaning of these raw materials in the prior art is an expensive and dirty job. The present systemitized waste product separation and total utilization means 10 eliminates these problems. This automatic cleaning operation is an important feature of the present invention.

The present invention uses the aforementioned shearing type mechanical shredder 14 to cut the waste product materials into chunk-size instead of grinding or pulverizing them. Such shredders are available commercially and will accept and shred essentially all waste products. The large chunk-size inorganic waste materials are thoroughly cleaned by the bacteria action in the automatic and mechanically controlled composting means 24, and screening 26, and because of their size are recoverable as hereinafter described.

As the composted material is discharged from the automatic and mechanically controlled composting means 24 it is conveyed by mechanical conveying means 48 to a mechanical screening means 26, which is also available commercially. The mechanical screening means 26 in its vibratory or shaking type of operation separates substantially all of the fine compost particles and retrieves the large particles of chunk-size inorganic materials of the waste products. Any remaining bits of compost on the large particles can be flushed or rinsed off if necessary, a much simpler process than the prior art laborious cleaning method. This cleaning process through the automatic and mechanically controlled composting means 24 makes the recovered raw materials reasonably "clean" and more acceptable by scrap dealers and those companies engaged in separating this material, known as "concentrate" in the trade.

The chunk-size materials, which have been cleaned of extraneous matter by the automatic and mechanically controlled composting means 24, permits the separation equipment to perform better as described hereinafter. In addition, any required washing and flotation cleaning are much easier and simpler.

The automatic and mechanically controlled composting means 24 in combination with the mechanical screening means 26 produces a form of compost from the unwanted or undesirable garbage, sewage sludge, and other biodegradable waste products that can be sold in bulk for distribution 68 at this point as a soil conditioner for agricultural uses. As a matter of fact the combination of the noted waste products provide a more nutritionally balanced compost than when made from sewage sludge only.

The fine compost particles which are not disposed of in bulk for distribution 68 for agricultural uses are conveyed by mechanical conveyor means 50 to an automatic and mechanically controlled compost curing means 32 for further processing to remove odors, further drying and then packaged for distribution or distributed in bulk 70. This automatic and mechanically controlled compost curing means 32 is also part of the aforementioned U.S. Pat. No. 4,374,804 by the present inventor. As hereinafter described, a portion of the cured compost material from the automatic and mechanically controlled compost curing means 32 may be shunted or conveyed by the mechanical conveyor means 52 to a combination mechanical grinder and mixer means 34.

The aforementioned large particles of waste products from the mechanical screening means 26 are conveyed by a mechanical conveyor means 54 to a mechanical magnetic separator means 28 for magnetically separating ferrous type scrap particles as described hereinafter.

Large particles of waste products that are not removed by the mechanical magnetic separator means 28 are conveyed by mechanical conveyor means 56 to a mechanical ballistics separator means 30 which separates the remaining waste product particles into several categories as described hereinafter.

Referring now to FIG. 3, as the large particles of waste products from the screening means 26 arrive on the mechanical conveyor means 54 at the mechanical magnetic separator means 28, the mechanical conveyor means 54 passes under a parallel magnetic mechanical conveyor means 72 which is a component of the mechanical magnetic separator means 28. All of the ferrous metal waste products, now in the category of scrap material, are magnetically attracted by and to a strong magnet which is an element of the magnetic mechanical conveyor means 72. The ferrous metal scrap particles 74 cling to the underside of the magnetic mechanical conveyor means 72 as it moves above the mechanical conveyor means 54.

The magnetic mechanical conveyor means 72 extends beyond the end of the mechanical conveyor means 54 and carries the clinging ferrous metal particles 74 beyond the end of the mechanical conveyor means 54. The remaining non-ferrous waste and/or scrap particles on the mechanical conveyor means 54 drop off the end of the mechanical conveyor means 54 into a hopper means 76 which deposits the particles on mechanical conveyor means 56 for transport to the mechanical ballistics separator means 30 and further separation as described hereinafter.

The end of the magnetic mechanical conveyor means 72 extends beyond the hopper means 76 and over a hopper means 78. As the ferrous metal particles 74 clinging to the magnetic mechanical conveyor means 72 arrive over the hopper means 78 it is the end of the influence of the strong magnet element of the magnetic mechanical conveyor means 72 and the clinging ferrous metal particles 74 are released and drop into the hopper means 78.

The hopper means 78 feeds the ferrous metal particles to a mechanical conveyor means 80, which is also an element of the mechanical magnetic separator means 28. As the ferrous metal particles travel along the mechanical conveyor means 80, the mechanical conveyor means 80 passes under a parallel second magnetic mechanical conveyor means 82, which is also an element of the mechanical magnetic separator means 28. This second magnetic mechanical conveyor means 82 has a weak magnet means as an element of it and it attracts only the lighter ferrous metal particles 84, in particular the light weight tinned sheet metal particles. The heavier ferrous metal particles remain on the mechanical conveyor means 80.

The attraction of the light weight tinned metal parts by and to the second magnetic mechanical conveyor means 82 is an operation similar to the aforementioned operation of the magnetic mechanical conveyor means 72. The heavy ferrous metal particles continue along the mechanical conveyor means 80 and drop off of the end into a hopper means 86. As in the operation of the first magnetic mechanical conveyor means 72, the second magnetic mechanical conveyor means 82 extends beyond the hopper means 86 and over a hopper means 88. As the light weight tinned ferrous metal particles 84 arrive over the hopper means 88, the influence of the weak magnet means of the second magnetic mechanical conveyor means 82 ends and releases the metal particles 84 which drop into the hopper means 88.

Thus, the mechanical magnetic separator means 28 has automatically separated the ferrous metal scrap particles from the total mass of cleaned waste products, and further automatically separated the ferrous metal particles into the heavier scrap metal particles for distribution 87 to ferrous metal dealers, and into tinned metal particles for distribution 89 to detinners.

Turning next to FIGS. 1 and 4, the residue of nonferrous waste product particles moving from hopper means 76 are conveyed by mechanical conveyor means 56 to the mechanical ballistics separator 30. The residue of non-ferrous waste product particles transfer from the mechanical conveyor means 56 to the mechanical ballistics projector means 90, a component of the mechanical ballistics separator 30.

The non-ferrous waste product particles 91, riding on the mechanical ballistics projector means 90, are hurled off the end of the high-speed mechanical ballistics projector means 90 in various trajectories in relation to the relative weights of the materials in the make-up of the non-ferrous waste product particles 91.

The trajectories can be seen in FIG. 4 in which the various trajectories can be seen landing particles in a plurality of receiving hoppers 92, 94, 96, and 98. It is to be understood that if the elemental makeup of the non-ferrous waste product particles 91 requires additional hopper means, the additional hopper means are within the scope and intent of the present invention. Four hopper means (92, 94, 96, and 98) are illustrated for purposes of description.

Under normal operations the hopper means 92 might receive glass particles, hopper means 94 might receive aluminum particles, hopper means 96 might receive copper and brass particles, and hopper means 98 might receive rocks, ceramics, and similar materials. Adjustments of the hopper locations and/or the speed of the mechanical ballistics projector means 90 can be made to match the trajectories and/or hopper locations respectively of the various elemental particle make-up of the non-ferrous waste product particle mix 91.

Once the non-ferrous particles are separated the distribution to dealers or other uses can be made. As illustrated in FIG. 1: glass particles would be distributed 100 from the receiving hopper 92; aluminum particles would be distributed 102 from the receiving hopper 94; copper and brass particles would be distributed 104 from the receiving hopper 96, and the ceramic, rock, and other similar matter might be disposed of without salvage or might be conveyed by mechanical conveyor means 58 to a mechanical mixer and grinder means 34 for grinding and mixing with compost particles from the compost curing means 32 before packaging 70 for agricultural and gardening use.

During the processing heated air, generated by the composting action of the automatic and mechanically controlled composting means 24, can be transferred to a hot house complex 106 to assist in the growth of plants.

Thus, the combination and special sequencing of various components into a cooperating arrangement with each other, to form an overall mechanically unique and novel structure, provides a means for systemitizing waste product separation and for the subsequent total utilization of all of the elements of the waste product mass. It is to be noted that once the waste products enter the system there is no manual handling, manual separation, or manual classification.

As can be readily understood from the foregoing description of the invention, the present structure can be configured in different modes to provide the ability to separate a mass of waste products into its elements or components and to effect the total utilization of the mass.

Accordingly, modifications and variations to which the invention is susceptible may be practiced without departing from the scope and intent of the appended claims.

What is claimed is:

1. A method for systemitizing the mechanical separation and classification of a mass of waste products into the component elements of said mass of waste products without any manual separation or classification of said mass of waste products and then making a total utilization of all of said component elements, comprising: mechanically shredding said waste product components into a plurality of bit pieces and a plurality of chunk-like sizes, then mechanically separating burnable light-weight particles of said component elements, mechanically incinerating said separated light-weight particles to generate a usable energy means, after mechanically removing said light-weight particles mechanically mixing all of the remaining components of said waste product components with sewage sludge, mechanically automatically composting the mixture of said remaining components of said waste product components and said sewage sludge to remove biodegradable materials and contaminants from recoverable materials, mechanically screening the composted materials to separate fine textured composted material for agriculture use from a mass of heavy large particles of the now cleaned non-biodegradable materials, mechanically automatically curing said fine textured composted material, mechanically and magnetically removing ferrous type materials from said mass of heavy large particles, and mechanically ballistically separating non-ferrous materials in said mass of heavy large particles into the components thereof, subsequently disposing of said separated ferrous and non-ferrous materials for recycling, and the cured composted material for agricultural uses, the aforementioned sequencing of operations affecting the resulting cleaned non-biodegradable materials and the effected separation and classification of said components of said mass of waste products.

2. A systemitized waste product totally mechanical separation means for total utilization of the components thereof, comprising:
a waste product receiving means;
a plurality of mechanical conveying means;
a mechanical shredder means, said mechanical shredder means being connected to said waste product receiving means by a first mechanical conveyor means of said plurality of mechanical conveying means;
a mechanical air separator means, said mechanical air separator means being connected to said mechanical shredder means by a second mechanical conveyor means of said plurality of mechanical conveying means;
a mechanical incinerator type energy generating means, said mechanical incinerator type energy generating means being connected to said mechanical air separator means by a third mechanical conveyor means of said plurality of mechanical conveying means;

a sewage sludge receiving means;

a mechanical mixing means, said mechanical mixing means being connected to said mechanical air separator means by a fourth mechanical conveyor means of said plurality of mechanical conveying means, and to said sewage sludge receiving means by a fifth mechanical conveyor means of said plurality of mechanical conveying means;

a controlled automatic mechanical composting means, said controlled automatic mechanical composting means being connected to said mechanical mixing means by a sixth mechanical conveyor means of said plurality of mechanical conveying means;

a mechanical screening means, said mechanical screening means being connected to said controlled automatic mechanical composting means by a seventh mechanical conveyor means of said plurality of mechanical conveying means;

a controlled automatic mechanical compost curing means, said controlled automatic mechanical compost curing means being connected to said mechanical screening means by an eighth mechanical conveyor means of said plurality of mechanical conveying means;

a mechanical and magnetic separator means, said mechanical and magnetic separator means being connected to said mechanical screening means by a ninth mechanical conveyor means of said plurality of mechanical conveying means;

a mechanical ballistic separator means, said mechanical ballistic separator means being connected to said mechanical and magnetic separator means by a tenth mechanical conveyor means of said plurality of mechanical conveying means; and a plurality of distribution means, individual units of said plurality of distribution means each being separately connected to said controlled automatic mechanical compost curing means, said mechanical and magnetic separator means, and said mechanical ballistic separator means, by an eleventh, twelfth, and thirteenth mechanical conveyor means, respectively, of said plurality of mechanical conveying means, the sequencing of each component of said systemitized waste product totally mechanical separation means through said plurality of mechanical conveying means from said first conveyor means through said thirteenth conveyor means being the cooperative means of the total structure of said systemitized waste product totally mechanical separation means.

3. A systemitized waste product totally mechanical separation means as recited in claim 2, wherein said waste product receiving means receives waste products from an external source, said waste products consisting of a plurality of component waste materials, some of which are salvageable and some of which are contaminated or which contaminate each other.

4. A systemitized waste product totally mechanical separation means as recited in claim 3, wherein said plurality of component waste materials may consist of varying amounts of salvageable ferrous and salvageable and non-salvageable non-ferrous materials, said non-ferrous materials may consist of glass, ceramics, aluminum, copper, brass, wood, paper, plastics, garbage, and other similar or dissimilar materials.

5. A systemitized waste product totally mechanical separation means as recited in claim 4, wherein said mechanical shredder means receives waste products from said receiving means, said mechanical shredder means cutting said waste products into a plurality of bit pieces and a plurality of chunk-size pieces.

6. A systemitized waste product totally mechanical separation means as recited in claim 5, wherein said mechanical air separator means has an air stream therethrough, said air separator means receiving said plurality of bit pieces and said plurality of chunk-size pieces of waste products from said mechanical shredder means, said mechanical air separator means separating paper, plastics, and other light-weight pieces of waste material, of high B.T.U. content, from said mass of waste product pieces by said air stream therethrough.

7. A systemitized waste product totally mechanical separation means as recited in claim 6, wherein said mechanical incinerator type energy generating means receives said high B.T.U. content pieces of waste material from said mechanical air separator means, said mechanical incinerator type energy generating means burning said waste material received to convert the resulting heat into a useable form.

8. A systemitized waste product totally mechanical separation means as recited in claim 6, wherein said fourth mechanical conveyor means conveys remainder of said waste products pieces, after removal of said high B.T.U. content pieces, from said mechanical air separator means to said mechanical mixing means.

9. A systemitized waste product totally mechanical separation means as recited in claim 8, wherein said sewage sludge receiving means receives sewage sludge from an external source.

10. A systemitized waste product totally mechanical separation means as recited in claim 9, wherein said mechanical mixing means receives said sewage sludge from said sewage receiving means, said mechanical mixing means mixing said sewage sludge with said remainder of waste product pieces received from said mechanical air separator means.

11. A systemitized waste product totally mechanical separation means as recited in claim 10, wherein said controlled automatic mechanical composting means receives said mixed sewage sludge and said remainder of waste products pieces from said mechanical mixing means, said controlled automatic mechanical composting means composting the mixture of said sewage sludge and said remainder of waste product pieces, thereby biodegradably cleaning said contaminating materials from non-compostable components of said remainder of waste product pieces during said composting to complete the process.

12. A systemitized waste product totally mechanical separation means as recited in claim 11, wherein said mechanical screening means receives composted mixture from said controlled automatic mechanical composting means and, by mechanically screening said composted mixture, separates said composted mixture into fine particles of composted organic materials and into large inorganic materials, said inorganic materials consisting of glass, metals, and other materials, said inorganic materials having been biodegradably cleaned of said contaminants by said composting process.

13. A systemitized waste product totally mechanical separation means as recited in claim 12, wherein said controlled automatic mechanical compost curing means receives said fine particles of composted organic materials, said controlled automatic mechanical compost curing means thereafter further processing said composted fine particles to remove odors and to prepare composted fine particles for packaging.

14. A systemitized waste product totally mechanical separation means as recited in claim 12, wherein said mechanical and magnetic separator means receives a mass of said large inorganic materials from said mechanical screening means, said mechanical and magnetic separator means separating ferrous materials from said mass of said large inorganic materials, said separation being accomplished by a strong magnetic means located internally within said mechanical and magnetic separator means, thereafter the remainder of said large inorganic materials being non-ferrous, after separating said ferrous materials from said mass of large inorganic materials, said ferrous materials thereafter being deposited internally into a second hopper means located within said mechanical and magnetic separator means for further processing.

15. A systemitized waste product totally mechanical separation means as recited in claim 14, wherein said mechanical and magnetic separator means consists of: a first magnetic mechanical conveyor means, said first magnetic mechanical conveyor means being equipped with a strong magnetic means; a transfer mechanical conveyor means; a second magnetic mechanical conveyor means, said second magnetic mechanical conveyor means being equipped with a weak magnetic means; a first hopper means; said second hopper means; a third hopper means; and a fourth hopper means.

16. A systemitized waste product totally mechanical separation means as recited in claim 15, wherein said first magnetic mechanical conveyor means is suspended and superimposed over and spaced from and parallel with said ninth mechanical conveyor means, said ninth mechanical conveyor means having a first end and a second end, said first magnetic conveyor means being superimposed over a portion of the longitudinal length of said ninth mechanical conveyor means and extending substantially beyond said second end thereof, said strong first magnetic mechanical conveyor means magnetically attracting, removing, and holding, a mass of both heavy ferrous materials and light-weight tinned ferrous materials contained in said mass of large inorganic materials, thereby conveying said heavy ferrous materials and said light-weight tinned ferrous materials to said second hopper means, and concurrently the remainder of said mass of large inorganic materials being conveyed by said ninth mechanical conveyor into said first hopper means.

17. A systemitized waste product totally mechanical separation means as recited in claim 16, wherein said heavy ferrous materials and said light-weight tinned ferrous materials in said second hopper means are thereafter transported from said second hopper means by said transfer mechanical conveyor means, said transfer mechanical conveyor means having a first end and a second end, said weak second magnetic conveyor means being suspended and superimposed over and spaced from and parallel with said transfer mechanical conveyor means, said weak second magnetic mechanical conveyor means being superimposed over a portion of the longitudinal length of said transfer mechanical conveyor means and extending substantially beyond said second end thereof, said weak magnetic means of said second magnetic mechanical conveyor means magnetically attracting, removing, and holding said light-weight tinned ferrous materials contained in the total said mass of said ferrous materials, thereby conveying said light-weight tinned ferrous metals to said fourth hopper means and the remainder being said heavy ferrous metals thereafter being conveyed into said third hopper means.

18. A systemitized waste product totally mechanical separation means as recited in claim 14, wherein said mechanical ballistic separation means recieves said non-ferrous materials from said first hopper means via said tenth mechanical conveyor means, said mechanical ballistic separation means thereafter ballistically separating the various components that make up said non-ferrous materials mixture, including a portion being non-metallic materials, into a plurality of receiving hopper means.

19. A systemitized waste product totally mechanical separation means as recited in claim 18, wherein said mechanical ballistic separation means consists of a high-speed mechanical conveyor means to ballistically hurl various components of said non-ferrous materials through dissimilar trajectories, and additionally, a plurality of hopper means, said plurality of hopper means being individually positioned to receive said various components of said non-ferrous materials mixture at the end of their respective dissimilar trajectories.

20. A systemitized waste product totally mechanical separation means as recited in claim 19, and additionally, a mechanical mixer-grinder means, said mechanical mixer-grinder means being associated with said plurality of distribution means, wherein said mechanical mixer-grinder means receives a portion of cured composted particles from said compost curing means and materials from said non-metallic remainder of materials from said hopper receiving means of said ballistic separator means, said mechanical mixer-grinder means grinding said non-metallic materials and mixing the ground non-metallic materials with said cured composted particles for subsequent packaging.

21. A systemitized waste product totally mechanical separation means as recited in claim 11, wherein said composting process in said controlled mechanical composting means generates heated air, said heated air being thereafter conveyed to hot houses for assisting in plant growth.

22. A systemitized waste product totally mechanical separation means as recited in claim 12, wherein a portion of said fine particles of composted organic materials may be withdrawn in bulk for agricultural use without and before further curing.

23. A systemitized waste product totally mechanical separation means as recited in claim 20, wherein a portion of said cured composted organic materials may be withdrawn in bulk for packaging without processing through said mixer-grinder and mixing with other materials.

24. A systemitized waste product totally mechanical separation means as recited in claim 6, wherein said mechanical air separator means has a drum-like configuration in a longitudinal direction and revolves, said mechanical air separator means having a plurality of spirally configured vane-like means affixed to and extending from the interior periphery of said drum-like configuration, thereby forming spirally configured pockets around said interior periphery of said drum-like configuration, said bit pieces and said chunk-size pieces of waste material temporarily lodging in said spirally configured pocket-like openings and thereby being carried upwardly as said drum-like mechanical air separator means revolves, said bit pieces and said chunk-size pieces of waste spilling out as said pocket-like openings approach the top-most position, said spilling of said bit pieces and said chunk-size pieces of waste exposing them to said air stream therethrough as they fall downwardly by gravity, said spirally configured vane-like means further moving said bit pieces and said chunk-size pieces longitudinally through said drum-like mechanical air separator means by thrust action of said spirally configured vane-like means.

* * * * *